United States Patent [19]

Wendland

[11] 3,792,196

[45] Feb. 12, 1974

[54] PICTURE TRANSMISSION SYSTEM

[75] Inventor: Broder Wendland, Ay/Iller, Germany

[73] Assignee: Licentia Patent-Verwaltungs GmbH, Frankfurt am Main, Germany

[22] Filed: June 23, 1972

[21] Appl. No.: 265,795

[30] Foreign Application Priority Data

June 24, 1971 Germany .......................... 2131311

[52] U.S. Cl. .......... 178/6.8, 178/7.7, 178/69.5 TU, 178/DIG. 3

[51] Int. Cl. .......................... H04n 3/34, H04n 5/04

[58] Field of Search.. 178/6.8, 7.7, DIG. 3, 69.5 TV

[56] References Cited

UNITED STATES PATENTS

| | | | |
|---|---|---|---|
| 3,472,959 | 10/1969 | Stillwell | 178/7.7 |
| 2,222,934 | 11/1940 | Blumlein | 178/7.7 |
| 2,237,651 | 4/1941 | Bruche | 178/7.7 |
| 3,309,461 | 3/1967 | Deutsch | 178/DIG. 3 |
| 3,567,861 | 3/1971 | Webb | 178/69.5 TV |
| 2,911,463 | 11/1959 | Kretzmer | 178/7.7 |
| 3,499,980 | 3/1970 | Smierciak | 178/7.7 |
| 3,239,606 | 3/1966 | Chatten | 178/7.7 |
| 3,215,773 | 11/1965 | Chatten | 178/7.7 |

*Primary Examiner*—Howard W. Britton
*Attorney, Agent, or Firm*—Spencer & Kaye

[57] ABSTRACT

A television system in which, at both the transmitting end and the receiving end, the picture is scanned by an undulating scanning beam which during each horizontal scanning period scans picture elements lying in a plurality of adjacent rows, the undulating beam tracing a path which alternates between the rows.

11 Claims, 9 Drawing Figures

The actual shape of the deflection curve with which the scanning takes place according to the invention is of no significance, it is only necessary that the scanning wave scan in succession the image points arranged on the undulating lines of FIG. 1.

FIG. 2 shows the form of two other wave shaped scanning paths disposed one under the other. Each one of these wave lines has such a shape that it is possible for each of them to scan the image points of four adjacent lines of the picture. The wave lines shown in FIG. 2 can be produced by superimposing a sinusoidal oscillation with a frequency $f_1$ and an amplitude A1 and a second sinusoidal oscillation with a frequency 3 $f_1$ and an amplitude A 1/2 on the linear scanning signal. During each sinusoidal scanning traversal having the form shown in FIG. 2, only about one-half of the image elements of one row, or line are being scanned; the other half of the image elements of this row are scanned by the immediately following scanning traversal or were scanned by the immediately preceding scanning traversal.

The above-mentioned amplitude A1 corresponds to the average spacing of the adjacent sinusoidal scans from one another. In an analogous manner, as already explained in connection with FIG. 1, the system according to FIG. 2 may be so designed that it is compatible with a conventional television system.

The density of the image elements measured in the horizontal and vertical directions corresponds to that of FIG. 1. For this reason, when the picture transmission system described in connection with FIG. 2 is adapted to a conventional television system, the upper limit frequency for the video band should also be selected to have approximately the fourfold value of the upper limit frequency of the conventional system.

An advantage of the system depicted in FIG. 2 is that during reception no edge flutter occurs as a result of the line interlacing process, since with the scan of FIG. 2 image elements are being scanned in one line scanning period which belong to horizontal lines which will also be scanned during the subsequent scanning period, so that each half-frame, or field, contains information about the picture brightnesses along both vertical edges of the picture.

The present invention is not limited to the scanning curves shown in the drawings, and other curve shapes may be employed.

FIGS. 3–6 show embodiments of the picture transmission and reception system according to the present invention.

Since the components or groups of components required in these embodiments are quite well known in the art, only block circuit diagrams are given for ease of understanding.

FIG. 3 illustrates a transmission system in which a sinusoidal deflection of the picture scanning beam having the form shown in FIG. 1 is effected by providing the camera tube with an additional vertical deflection coil 1. This coil is fed by the sinusoidal current of an oscillator 2 whose output frequency should be selected to be four times as high as the maximum video frequency in the conventional television systems, for example 16 MHz in the United States of 20 MHz in Europe. With a rectangular picture to be transmitted it is advisable, for physiological reasons, for the number of image elements per sine wave scan to be about four times the number of scans per frame. In order to keep the picture scanning exactly within the minima and maxima of the sinusoidal deflection, appropriate frequency dividers 3, 4 and 5 are used to derive the line scanning frequency fz and the vertical scanning frequency fb from the frequency of the output of oscillator 2. For the European television transmission system operating with 625 lines per frame and 25 frames per second, and employing the line interlaced scanning method, the divider 3 must have a dividing ratio of $$1/n1 = 2\,fz/20\text{ MHz} = 31.25\text{ kHz}/20\text{ MHz} = 1.5625.10^{-3}\text{ at an oscillator frequency of 20 MHz.}$$

The dividing ratio of divider 4 is then $$1/n2 = 1/625$$

so that fB = 31.25 kHz/625 = 50 Hz.

The dividing ratio of divider 5 is known to be ½. Corresponding values can be derived for the United States 525-line system.

FIG. 4 illustrates the circuitry required at the receiving end. Here the sinusoidal line deflection is effected by an added vertical deflection coil 11, which may be additionally arranged, for example, at the neck of the picture tube. It is driven by the current from oscillator 9.

Oscillator 9 is frequency stabilized by a phase locked loop circuit 6 including a frequency divider 8, a phase discriminator 7, an integrator 10 and the voltage controlled oscillator 9. Oscillator 9 and oscillator 2 of FIG. 3 oscillate at the same frequency, e.g. 20 MHz. This frequency is reduced to the line scanning frequency, Fz, by the frequency divider 8 with the dividing ratio $1/(2\cdot n1)$ and is compared in the phase discriminator 7 with the line frequency sync pulses of the transmitted video signal.

FIG. 5 shows an embodiment for producing the meander-shaped picture scan of FIG. 2 at the transmitter. For this purpose, a voltage divider 12 having a ratio of 1/2 and a summing member 13 are connected between the additional vertical deflection coil 1 and the oscillator 2. The meander-shaped signal is derived in that a signal with twice the amplitude as that superimposed at the output of voltage divider 12 and a frequency which is 1/3 that of the output of oscillator 2 is produced in frequency divider 14 and added in the correct phase in the summing member 13. For this purpose the frequency divider 14 preferably consists of two binary dividers which in a manner known per se by means of a suitable internal feedback divides the input frequency with a ratio 1 to 3. This divider 14 is reset to 0 by a reset pulse R derived from the line scanning frequency *fz* so that the meander-shaped scanning begins in the same manner at the start of each line. The other dividers 3, 4 and 5 shown in FIG. 5 and their functions correspond to those described in connection with FIG. 3.

FIG. 6 shows an embodiment of a circuit for producing a corresponding meander-shaped deflection at a receiver during picture reception. Phase discriminator 7, integrator 10, oscillator 9 and frequency divider 8 form the circuit 6 described with reference to FIG. 4. This circuit assures that oscillator 9, which operates at the same frequency as the oscillator 2 at the transmitting end, is synchronized therewith. In order to produce the meander-shaped signal for the added vertical deflection coil 11 of the picture tube, a signal whose ampli-

PICTURE TRANSMISSION SYSTEM

BACKGROUND OF THE INVENTION

The present invention relates to a picture transmission system for transmitting the brightness information for point-like elements arranged in a succession of picture lines. A known picture transmission system is, for example, television, in which pictures are scanned line by line at the transmitting end and the brightness information of consecutive picture points, or elements, is transmitted. According to the standards for one of these systems, for example, there are 625 lines per picture, or frame, with 25 frames, or changes of picture, per second. To reduce flicker during the picture reproduction, the so-called line interlaced scanning method is used. The resolution associated with the picture scanning and reproduction is limited by the available bandwidth; roughly calculated, about 600 picture elements can be transmitted per line.

SUMMARY OF THE INVENTION

It is an object of the present invention to provide a picture transmission system of the above-mentioned type in which, with the prerequisite of sufficient available bandwidth, a higher resolution can be obtained using a horizontal line scanning frequency comparable to that of the known systems.

The present invention accomplishes this by causing the horizontal picture scanning lines to be not linear, but rather to have a waved shape, with the picture elements lying on the maxima and minima of the curve, and, for transmitting an approximately square picture, the number of picture elements per scanning line is greater than the number of scanning lines per frame, and at the receiving end reproducing the picture in synchronism with the scanning at the transmitting end.

Wave-shaped scanning is understood herein to mean, not only scanning over an approximately sinusoidal path, but also scanning over a rectangular path or a triangular path, i.e., rectangular or sawtooth waves. This includes curves which have, in addition to their absolute maxima and minima possibly also relative or intermediate maxima and minima.

DESCRIPTION OF THE PREFERRED EMBODIMENTS

Figure 1:
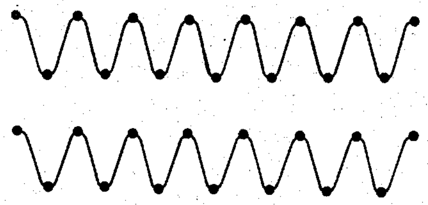
FIG. 1 is a pictorial view of a sine wave picture scanning according to the invention.
Figure 2:
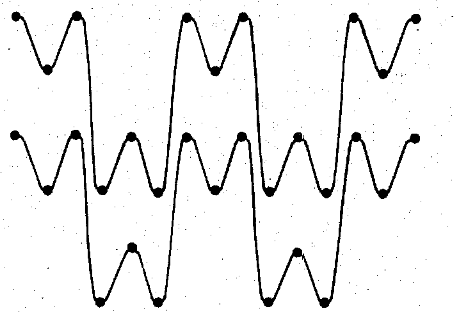
FIG. 2 is a pictorial view of a meander-shaped picture scanning according to the invention.

FIG. 1 shows the path of two sinusoidal scanning lines. The elements of the picture to be scanned for obtaining brightness information are illustrated by darker points and are disposed at the extreme values, i.e., upper and lower peaks, of each sinusoidal scanning line. The peak-to-peak amplitude of each sine wave is one-half of the average distance between adjacent sine waves. It can be seen that, although the individual image elements are arranged in straight lines, a total of four lines being shown, the individual image points of one straight line are not scanned in succession, but rather the image points of two adjacent lines are scanned alternately.

The system of the present invention may be so designed that the number of sine wave scanning lines, or traversals, required for scanning a picture coincides with the number of picture lines employed in the known television system and additionally, analogously to the known line interlacing method, each transmitted picture frame can be divided into two fields, only one-half of the total number of horizontal scanning lines used for the total picture being employed for each field.

If such an approximation of the system of the present invention to the existing television system is made, the sine wave scanning lines can be created in a simple manner at the camera end by means in the camera which superimpose a sinusoidal vertical deflection to the essentially horizontal line scanning beam used in the conventional television system.

In the same manner, additional means may be provided at the receiving end, in the receivers, to superimpose a vertical sinusoidal movement on the essentially horizontal and linear line scanning movement of the picture-reproducing beam.

One advantage of the system of the present invention, as described above, is that with the above-described adaptation to an existing television system there exists compatibility between the existing television system and the system according to the present invention. The transmission of the signal from a camera operating according to the system of the present invention requires about four times the video frequency bandwidth as in the conventional television systems since four times the number of image element brightness values are transmitted, compared to the conventional system per unit area of the picture. Such transmission can be effected over the transmission channel of the conventional system, whose bandwidth is actually too narrow to transmit all of the information, and over a broadbanded channel which is adapted to the system of the present invention. At the receiving end, receivers for the conventional system as well as receivers for the system according to the present invention can be employed. Reception with the high resolution furnished by the transmitting end is possible only, however, when the transmission channel as well as the receiving instruments are equipped to process the picture signals of the system of the present invention. If only a narrowbanded transmission channel of the conventional system is used for the transmission, or the receiver at the receiving end is of a conventional type, the picture is reproduced only with the detail possible with the conventional system.

tude is twice that of the signal from voltage divider 12 and whose frequency is 1/3 that of the signal from divider 12 is produced in frequency divider 14 and is added in the summing member 13 in the correct phase, in the same manner as in the process at the transmitting end described above with reference to FIG. 5. For this purpose the frequency divider 14 preferably consists of two binary dividers which in a manner known per se by means of a suitable internal feedback divides the input frequency with a ratio 1 to 3. This divider 14 is reset to 0 by a reset pulse R derived from the line sync pulse of the video signal so that at the receiving end the meander-shaped deflection likewise begins in the same manner at the start of each line.

Figure 7:
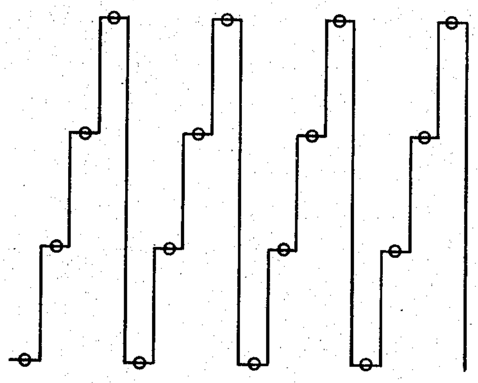
FIG. 7 is a pictorial view of a stair-shaped wave picture scanning according to the invention.

FIG. 7 shows a wave line which has such a stair-shape that it is also possible to scan the image points of four adjacent lines of the picture.

Figures 8, 9:
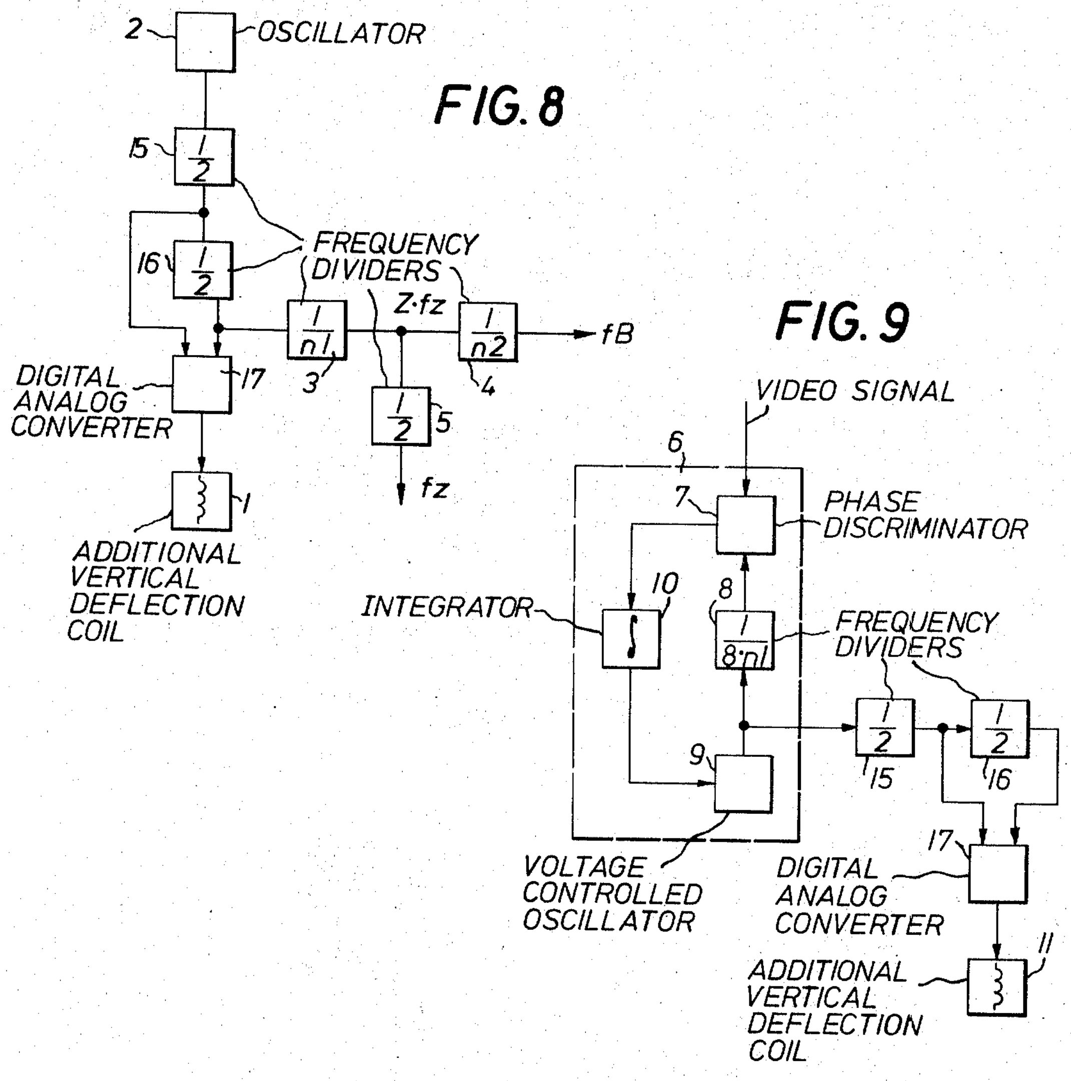
FIG. 8 is a block diagram of a circuit for a stair-shaped wave picture scanning of the form shown in FIG. 7.
FIG. 9 is a block diagram of a circuit for the reproduction of a receiver of a picture with stair-shaped wave line deflection.

FIG. 8 shows an embodiment for producing the stair-shaped picture scan of FIG. 7 at the transmitter. For this purpose, two binary frequency dividers 15 and 16 each having a ratio of 1/2 and a digital-analog converter 17 are connected between the additional vertical deflection coil 1 and the oscillator 2.

The stair shaped signal is derived in that a square wave-shaped signal produced by a frequency divider 15 having a ratio 1/2 and a second square-wave-shaped signal produced by a second frequency divider 16 also having a ratio 1/2, and which is connected in serial with the first frequency divider 15 are connected with a digital-analog converter 17.

The embodiment consisting of the two frequency dividers 15 and 16 and the digital-analog converter 17 represents a staircase generator for four equidistant steps.

In order to keep the picture scanning exactly within the steps of the stair-shaped deflection the frequency divider 3 is connected with the output of the frequency divider 16.

Figures 3, 4, 5, 6:
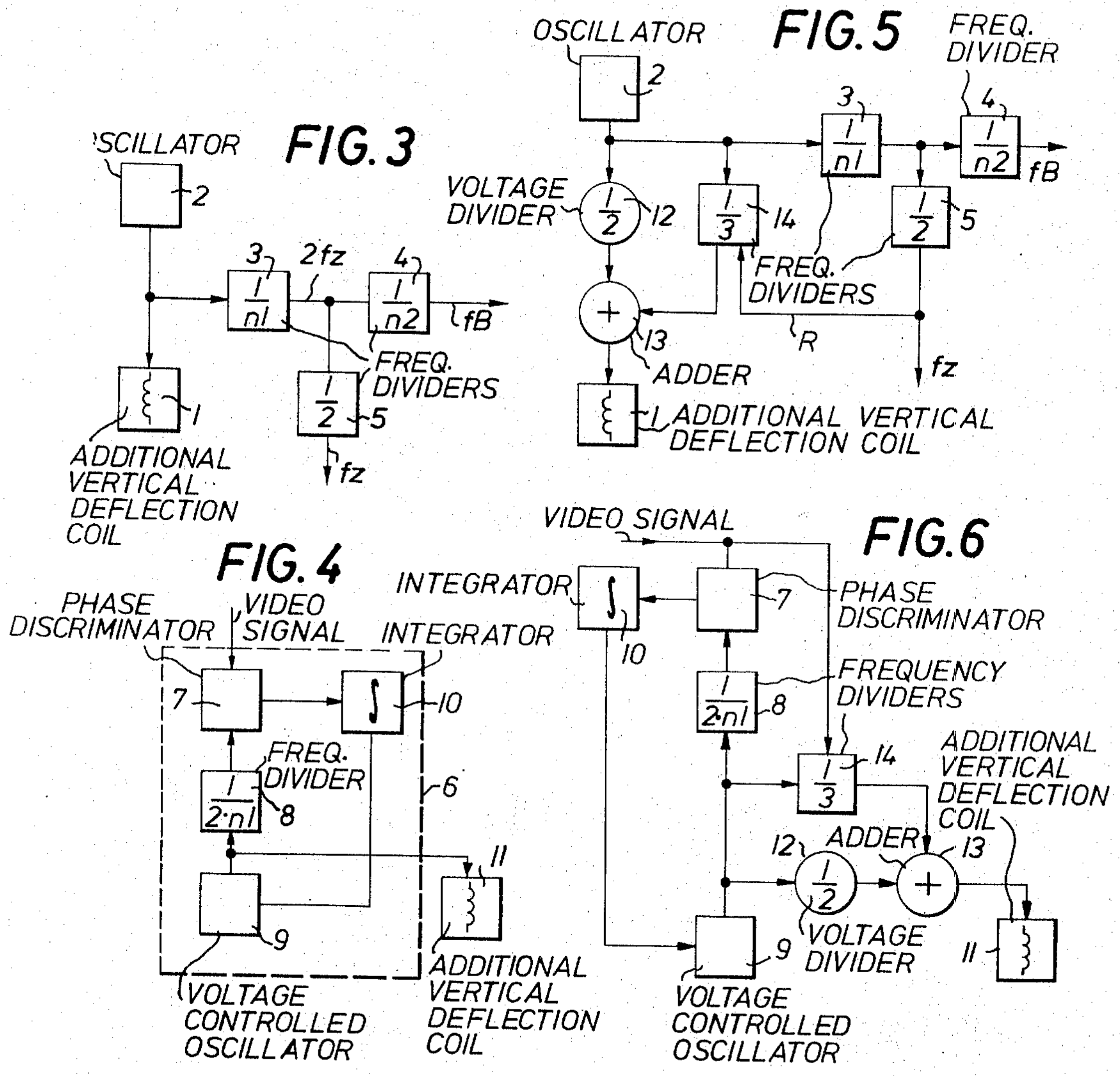
FIG. 3 is a block diagram of a circuit for a sine wave picture scanning of the form shown in FIG. 1.
FIG. 4 is a block diagram of a circuit for the reproduction at a receiver, of a picture with sine wave line deflection.
FIG. 5 is a block diagram of a circuit for a meander-shaped picture scanning of the form shown in FIG. 2.
FIG. 6 is a block diagram of a circuit for picture reproduction employing a meander-shaped line deflection.

The other dividers 4 and 5 shown in FIG. 8 and their function correspond to those described in connection with FIG. 3.

FIG. 9 shows an embodiment of a circuit for producing a corresponding stair-shaped deflection at a receiver during picture reception.

Phase discriminator 7, integrator 10, oscillator 9 and frequency divider 8 form the circuit 6 described with reference to FIG. 4, however the frequency divider 8 has a ratio $1/(8 \cdot n1)$.

This circuit assures that oscillator 9, which operates at the same frequency as the oscillator 2 at the transmitting end is synchronized therewith.

In order to produce the stair-shaped signal for the added vertical deflection coil 11 of the picture tube, a staircase generator, comprising two frequency dividers 15 and 16 each having a ratio 1/2, and a digital-analog converter 17, is connected between the output of the voltage controlled oscillator 9 and the additional vertical deflection coil 11.

The function of the stair case generator corresponds to that embodiment, consisting of the both frequency dividers 15 and 16 and the digital-analog converter 17 described in connection with FIG. 8.

It will be understood that the above description of the present invention is susceptible to various modifications, changes and adaptations, and the same are intended to be comprehended within the meaning and range of equivalents of the appended claims.

I claim:

1. In a video picture transmission system utilizing interlaced scanning of a picture frame including a transmitter in which the brightness information is transmitted for an image whose elements are located in a series of parallel rows, and a receiver, the improvement comprising: means at the transmitter for scanning the image along a series of scanning lines each following an undulating path so as to scan a portion of the image elements lying in each of four adjacent rows with the paths of adjacent scanning lines being interlaced and the image elements associated with each scanning line being disposed at the points of change of direction of the undulating path, said means causing the number of image elements scanned per line to be greater than the number of scanning lines used for the transmission of a picture frame; and means at the receiver for reproducing the scanned image in synchronism with, and with the same scanning paths as, the picture scanning produced by said means at the transmitter.

2. An arrangement as defined in claim 1 wherein said means at the transmitter produce an approximately rectangular picture to be transmitted and cause the number of image elements per scanning line to be approximately four times the number of scanning lines per frame.

3. An arrangement as defined in claim 1 wherein said means at the transmitter cause each of the scanning lines to have a stair shape.

4. An arrangement as defined in claim 3 wherein said means at the transmitter form the scanning lines by a staircase generator generating four equidistant steps wherein the amplitude of a step is about four times the width of the step.

5. An arrangement as defined in claim 3 wherein the transmitter includes a camera tube having horizontal and vertical deflection means and producing horizontal scanning lines and said means at the transmitter comprises: an additional vertical deflection coil; an oscillator; a staircase generator and a digital-analog converter connected between said oscillator and the additional vertical deflection coil, the frequency of the output of said oscillator being approximately sixteen times the upper limit frequency of the video signal in a conventional television system; further frequency dividers connected to the output of the frequency divider 16 of the said staircase generator for deriving from its output the horizontal and vertical synchronizing signals for the deflection units of the camera.

6. An arrangement as defined in claim 3 wherein said means at the receiver comprise a vertical deflection coil; a phase locked loop circuit synchronized by the video signal received at the receiver; and a staircase generator connected between said loop circuit and said coil for feeding said coil.

7. An arrangement as defined in claim 1 wherein said means at the transmitter cause each of the scanning lines to have a meander shape.

8. An arrangement as defined in claim 7 wherein the transmitter includes a camera tube having horizontal and vertical deflection means and producing horizontal scanning lines and said means at the transmitter comprises: an additional vertical deflection coil; a summing member whose output is connected to feed said coil; an oscillator; a voltage divider and a frequency divider connected between said oscillator and said summing member, the frequency of the output of said oscillator being approximately four times the upper limit frequency of the video signal in a conventional television system; further frequency dividers connected to said oscillator for deriving from its output the horizontal and vertical synchronizing signals for the deflection units of the camera.

9. An arrangement as defined in claim 7 wherein said means at the receiver comprise a vertical deflection coil; a phase locked loop circuit synchronized by the video signal received at the receiver; and a frequency divider, a voltage divider, and a summing circuit connected between said loop circuit and said coil for feeding said coil.

10. An arrangement as defined in claim 7 wherein said means at the transmitter form the scanning lines by superimposing two sinusoidal waves whose periods have a ratio of 1 : 3, the amplitude of the wave with the longer period being greater than that of the wave with the shorter period.

11. An arrangement as defined in claim 10 wherein the peak-to-peak amplitude of the wave with the longer period equals the average distance between adjacent lines and the amplitude of the wave with the shorter period is one-half the average distance between adjacent lines.

* * * * *

UNITED STATES PATENT OFFICE
CERTIFICATE OF CORRECTION

Patent No. 3,792,196 Dated February 12th, 1974

Inventor(s) Broder Wendland

It is certified that error appears in the above-identified patent and that said Letters Patent are hereby corrected as shown below:

Column 6, line 10, change "each of four" to --more than two--.

Signed and sealed this 20th day of August 1974.

(SEAL)
Attest:

McCOY M. GIBSON, JR.
Attesting Officer

C. MARSHALL DANN
Commissioner of Patents